United States Patent
Imura

[15] 3,672,280
[45] June 27, 1972

[54] CAMERA WITH RETRACTABLE LENS BARREL

[72] Inventor: Toshinori Imura, Osaka, Japan

[73] Assignee: Minolta Camera Kabushiki Kaisha, Minami-ku, Osaka, Japan

[22] Filed: May 4, 1970

[21] Appl. No.: 34,126

[30] Foreign Application Priority Data

May 13, 1969 Japan..................................44/43742

[52] U.S. Cl....................................................................95/39
[51] Int. Cl..........................................................G03b 17/04
[58] Field of Search.....................................................95/39

[56] References Cited

UNITED STATES PATENTS

| | | | |
|---|---|---|---|
| 2,732,776 | 1/1956 | Meixner | 95/39 |
| 2,890,638 | 6/1959 | Rentschler | 95/39 |
| 3,470,804 | 10/1969 | Waaske | 95/39 |
| 3,543,660 | 12/1970 | Waaske | 95/39 X |

FOREIGN PATENTS OR APPLICATIONS

| | | | |
|---|---|---|---|
| 802,038 | 12/1950 | Germany | 95/39 |
| 904,729 | 2/1954 | Germany | 95/39 |
| 964,202 | 5/1957 | Germany | 95/39 |

Primary Examiner—Samuel S. Matthews
Assistant Examiner—Michael Harris
Attorney—Watson, Cole, Grindle & Watson

[57] ABSTRACT

A plurality of guides 11 are mounted symmetrically about the optical axis of a camera to support a lens structure between picture taking and rest position. A spring is mounted around each guide to urge the lens barrel out from the camera casing. First interlocking members (28a), (28b) restrain the lens barrel at its rest position. Second interlocking members (27a), (27b) support the barrel at a selected picture taking position. A ring 25 is rotated to unlock the interlocking members from detents (13a), (13b) to allow the lens barrel to be moved.

3 Claims, 5 Drawing Figures

CAMERA WITH RETRACTABLE LENS BARREL

BACKGROUND OF THE INVENTION

In the prior art retractable lens barrel camera wherein the lens barrel is moved back and forward linearly relative to the camera body, it is necessary to provide a clearance between the sliding parts and a spring force to extend the lens barrel to its pull-out position relative to the camera body which causes the optical axis of photographic lens in the lens barrel to deviate from its proper position. Additionally the restraining member provided on the side of camera body for restraining the lens barrel in its pulled-out position and its pushed-in position produces an undesirable deviation to the lens barrel and as a result, when the lens barrel is pulled out to its photographic position the proper positioning for the photographic lens is not obtained. Besides, there is a disadvantage in that the formation of the device for locking the release of shutter when the lens barrel is pushed in its housing position is complex.

SUMMARY OF THE INVENTION

In accordance with the present invention, when the lens barrel is pulled out to the photographic position, the photographic lens is restrained correctly in the proper position, and when it is pushed into the housing position, the locking and releasing of the shutter is reliably effected by means of a simple mechanism. The restraining member on the camera body presses the flange formed on the supporting cylinder for supporting the lens barrel into contact with the vertical face of the sliding bearing on the side of camera body so as to hold the optical axis of photographic lens normal with respect to the photosensitive face of the camera body. Additionally, the restraining member is adapted to apply a couple of forces about the center of the optical axis of the photographic lens so as to prevent a deviation of the optical axis. Also the operation arm of the shutter release operation plate provided slidably on the side of camera body engages with the release lever provided on the lens barrel and it locks in the push-in housing position of the lens barrel by engaging with the notch portion of the lens barrel.

The primary object of the present invention is to provide a camera with a retractable lens barrel provided with a restraining member for holding the lens barrel properly in its pulled-out photographic position so as not to deviate the optical axis of photographic lens from the proper position relative to the camera body.

The second object of the present invention is to provide a camera with a restractile lens barrel which restraining member holds the lens barrel in its pull-out position so that the optical axis of photographic lens is normal to the camera body in the proper position.

The third object of the present invention is to provide a camera with a retractable lens barrel which locks the shutter release member provided on the side of the camera body securely when the restraining member restrains the lens barrel in its pushed-in housing position.

The other objects of the present invention will be understood from the detailed description taken in conjunction with the accompanying figures

DESCRIPTION OF THE PREFERRED EMBODIMENT

Figure 1:
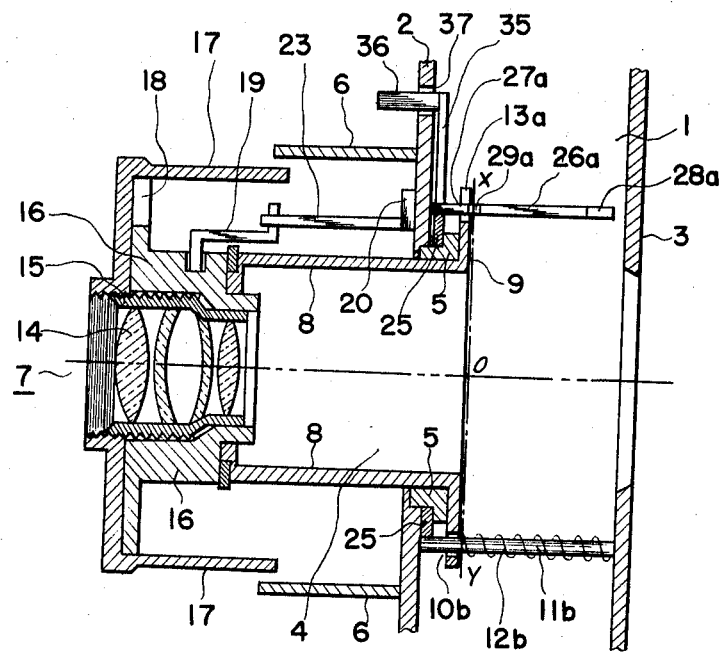
FIG. 1 is a sectional view of the lens barrel in the photographic state restrained in a pulled-out position, in an embodiment in accordance with the present invention along the line X—O—Y in FIG. 3.
Figure 5:
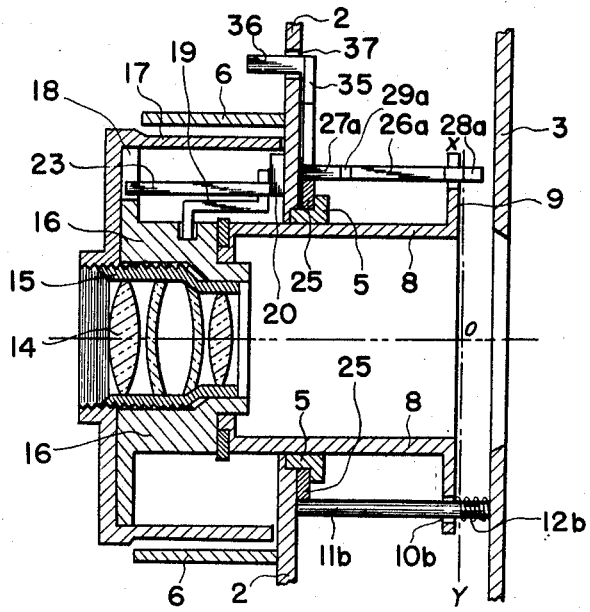
FIG. 5 is a development of a section of the lens barrel in the restrained pushed-in housing position, taken along line X—O—Y in FIG. 3.

In the embodiment shown in the drawings in accordance with the present invention, camera body 1 is provided with, as shown in FIGS. 1 and 5, case front wall 2 and case rear wall 3, and on the central portion of case front wall 2 opening 4 for fitting the lens barrel. On the circumferential edge of opening 4 there is formed sliding bearing 5 of an L-shape section for supporting by a pin cylinder 8 for the lens barrel as described hereinafter. In front of opening 4 there is concentrically mounted fixed lens barrel 6 the diameter of which is larger than that of opening 4.

In the rear of lens barrel 7 is supporting cylinder 8 for sliding in bearing 5 on opening 4, and on the rear end edge of supporting cylinder 8 flange 9 is mounted.

On flange 9 there are provided a plurality (only two are shown in the drawings) of small guide holes 10a, 10b symmetrically around the center of the optical axis in which guide pins 11a, 11b between the front and rear walls 2, 3 of camera body 1 are respectively fitted. And, between the back face of flange 9 and case rear wall 3 springs 12a, 12b are provided winding along guide pins 11a, 11b so as to press flange 9 forward. On the circumferential edge of flange 9 a plurality (only two are shown in the drawings) of notch restraining portions 13a, 13b are formed symmetrically with respect to the central axis thereof.

To the front of supporting cylinder 8 there is fixed shutter outer case 16 for movably bearing focusing cylinder 15 for holding photographic lens 14, the front end of shutter outer case 16 being formed into a flange shape. On the outer cylinder 17 projected backward from the flange shaped portion of shutter outer case 16 there are provided the focusing ring for moving the focusing cylinder 15 back and forth relative to the shutter outer case 16, the shutter speed adjusting ring and the diaphragm adjusting ring (which are all not shown in the drawings). The rear portion of outer cylinder 17 is fitted between supporting cylinder 8 and fixed lens barrel 6, and in the pushed-in housing position shown in FIG. 5 outer cylinder 17 is covered fully by fixed lens barrel 6.

Figure 2:
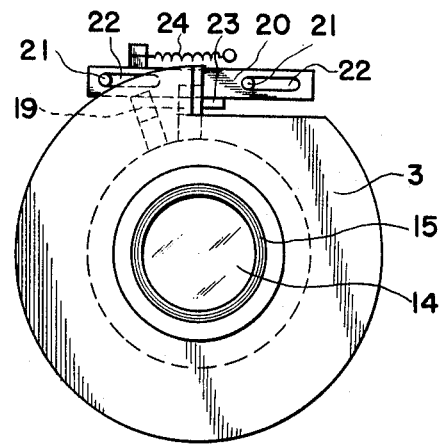
FIG. 2 is a front view showing the relation between the shutter release operation plate provided on the side of the camera body and the release lock device provided on the side of the lens barrel, in the embodiment shown in FIG. 1.

Release lever 19 extends from shutter outer case 16 and is bent into a bell crank shape in outer cylinder 17, and provided with a linear guide slot 22 guided by pin 21 provided on the front face of front wall 2 of the camera outer case, and in addition engages with operation arm 23 extending forward from release operation plate 20 provided on the side of the camera body and supported slidably on front wall 2, and biased to move to the right in FIG. 2 by means of spring 24. And, as shown in FIG. 5 when lens barrel 7 is pushed into its housing position against springs 12a, 12b, operation arm 23 engages notch portion 18 formed on the periphery of the flange shaped front edge of shutter outer case 16 so as to keep release operation plate 20 from sliding to the left in FIG. 2.

Restraining ring 25 mounted rotatably on the periphery of sliding bearing 5, between the back face of front wall 2 of the camera case body and flange 9 of supporting cylinder 8 is symmetric with respect to the center of ring 25 with a plurality (only two are shown in the drawings) of bent restraining arms 26a, 26b protruding rearward. Restraining arms 26a, 26b are provided with restraining steps 27a, 27b formed on the root sides thereof and restraining steps 28a, 28b formed on the end sides respectively relative to the central wide portion thereof. Root side restraining steps 27a, 27b have slopes 29a, 29b. And thus, restraining arms 26a, 26b are fitted into notch restraining portions 13a, 13b formed on flange 9.

On restraining ring 25, there are provided symmetrically to the center thereof a plurality (only two are shown in the drawings) of protrusions 30a, 30b projecting in the radial direction. Between protrusions 30a, 30b and the pins on front wall 2 of camera case body springs 31a, 31b are mounted to give counterclockwise rotation to restraining ring 25 as shown by arrow 32 in FIG. 3, and accordingly to move restraining arm 26a in the direction shown by arrow 33 in FIG. 4. Thereby restraining steps 27a, 27b or 28a, 28b of restraining arms 26a, 26b engage with notch restraining portions 13a, 13b of flange 9. And, operation pin 36 on release arm 35 protrudes in the radial direction from restraining ring 25 forward from arc-shaped hole 37 on front wall 2 of the camera case body, and by rotating restraining ring 25 clockwise in FIG. 4 against springs 31a, 31b by means of operation pin 36, the engagement of notch restraining portions 13a, 13b with restraining steps 27a, 27b or 28a, 28b of bend restraining arms 26a, 26b are released.

Since the present invention is formed as described above, in the photographic state lens barrel 7 is pulled out as shown in FIG. 1, restraining step 27a (27b) on the root side of restraining arm 26a (26b) engages with notch restraining portion 13a (13b) of flange 9 to prevent from being pushed rearward by the external force exerted on lens barrel 7. Simultaneously slope 29a (29b) presses flange 9 to come into contact with the vertical wall of sliding bearing 5 formed into an L-shaped section so as to support the optical axis of photographic lens 14 to be correctly at right angles to camera body 1, and in addition restraining arm 26a (26b) acts as a coupled force upon flange 9 of lens barrel 7, so that there is no force for deviating the optical axis of photographic lens 14 with respect to the center of opening 4 of camera body 1 and it is possible to hold photographic lens 14 in the proper position. And, by means of the focusing ring, the shutter speed adjusting ring, and the diaphragm adjusting ring not shown in the drawings but formed on outer cylinder 17 by, it is possible to focus and adjust the exposure, and by operating the release button not shown in the drawing on the side of camera body 1, operation plate 20 is moved to the left in FIG. 2 and operation arm 23 operates release lever 19 to photograph an object.

Figure 3:
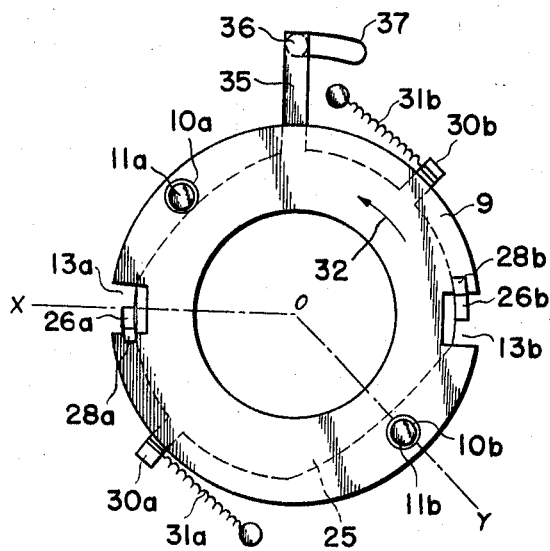
FIG. 3 is a rear view showing the relative arrangement between the restraining member provided on the side of the camera body and the flange of the lens barrel, in the embodiment shown in FIG. 2.
Figure 4:
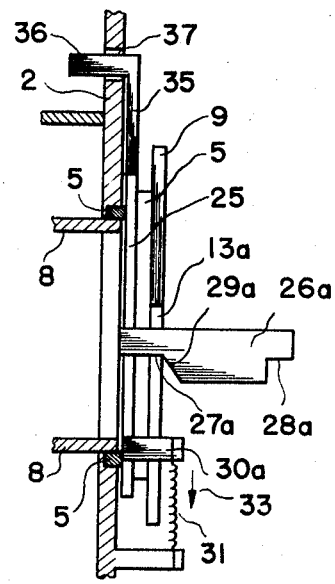
FIG. 4 is a partial top view of the embodiment shown in FIG. 3.

Next, when housing lens barrel 7 in the pushed-in position shown in FIG. 5, as a result of pushing pin 36 clockwise in FIG. 3 restraining ring 25 is rotated clockwise against springs 31a, 31b, through release arm 35, and the engagements of restraining steps 27a, 27b of restraining arms 26a, 26b with notch restraining portions 13a, 13b of flange 9 are disengaged. Then by pressing lens barrel 7 manually into the housing position while compressing springs 12a, 12b, and in said housing position end side restraining step 28a (28b) of restraining arm 26a (26b) engages with notch restraining portion 13a (13b) as shown in FIG. 5, so as to restrain flange 9 from projecting through spring (12a) 12b. And at the same time, the end of operation arm 23 provided on release operation plate 20 engages with notch portion 18 formed on the flange shaped front edge of shutter outer case 16 and is locked to prevent the shutter from misreleasing.

When pulling out lens barrel 7 from the housing position shown in FIG. 5 to the photographic position shown in FIG. 1, by moving operation pin 36 clockwise in FIG. 2, the end side restraining steps 28a, 28b of restraining arms 26a, 26b with notch restraining portions 13a, 13b are disengaged and lens barrel 7 is pushed out to the photographic position by springs 12a, 12b.

I claim:

1. Apparatus for moving the lens structure of a camera, comprising:
    a lens barrel bearing an objective lens which is advanced to a picture taking position and retracted to a rest position and a shutter casing surrounding said objective lens,
    a plurality of guide means mounted on the camera casing symmetrically about the optical axis of said objective lens to guide said lens barrel slidably parallel to said optical axis;
    a plurality of spring means mounted to the camera casing symmetrically with respect to said optical axis to project said lens barrel from the camera casing;
    a plurality of first interlocking means mounted to the camera casing symmetrically about said optical axis and biased to a position to restrain said lens barrel at said rest position against said spring means;
    means for stopping said lens barrel at said picture taking position;
    a plurality of second interlocking means mounted to the camera casing symmetrically about said optical axis and biased to a position to support said lens barrel at said picture taking position;
    and a manually operative means for releasing said first and second interlocking means from said restraining and supporting positions respectively.

2. Apparatus as in claim 1, further comprising:
    a shutter release member mounted on the camera case parallel to said optical axis and interlocking with said plurality of second interlocking means; and
    a lock member mounted on said lens barrel for locking said release member when said lens barrel is retracted to said camera casing and interlocked with said first interlocking means at said rest position.

3. Apparatus as in claim 1, wherein said first and second interlocking means comprise:
    a flange mounted on said lens barrel and having a plurality of holes through which a corresponding plurality of guide rods extend from said camera casing symmetrically to said optical axis;
    a plurality of restraining notches;
    a restraining member rotatably mounted on said camera casing;
    a plurality of restraining arms having first and second restraining steps extending symmetrically from said restraining member;
    a plurality of spring means mounted between said restraining member and said camera casing for interlocking each of said first or second restraining steps with each of said restraining notches; and
    a releasing lever extending from said restraining member to the outside of said camera casing to rotate said restraining member against said spring means so as to release the engagement between said first or second restraining steps and said restraining notches.

* * * * *